(12) United States Patent
Cruickshank (10) Patent No.: US 12,355,289 B2
(45) Date of Patent: *Jul. 8, 2025

(54) AUTONOMOUS BATTERY CHARGING AND DISCHARGING SYSTEM USING A LOAD SHAPING SIGNAL

(71) Applicant: Robert F. Cruickshank, Big Indian, NY (US)

(72) Inventor: Robert F. Cruickshank, Big Indian, NY (US)

( * ) Notice: Subject to any disclaimer, the term of this patent is extended or adjusted under 35 U.S.C. 154(b) by 284 days.

This patent is subject to a terminal disclaimer.

(21) Appl. No.: 18/094,656

(22) Filed: Jan. 9, 2023

(65) Prior Publication Data

US 2023/0223778 A1    Jul. 13, 2023

Related U.S. Application Data

(63) Continuation-in-part of application No. 17/774,943, filed on May 6, 2022, now Pat. No. 11,735,919, and a continuation-in-part of application No. 17/329,210, filed on May 25, 2021, now Pat. No. 12,237,678, which is a continuation-in-part of application No. PCT/US2020/062467, filed on Nov. 26, 2020.

(60) Provisional application No. 63/297,697, filed on Jan. 7, 2022, provisional application No. 62/940,922, filed on Nov. 27, 2019, provisional application No. 62/940,920, filed on Nov. 27, 2019.

(51) Int. Cl.
*H02J 7/00* (2006.01)

(52) U.S. Cl.
CPC ........ *H02J 7/00712* (2020.01); *H02J 7/0048* (2020.01)

(58) Field of Classification Search
CPC ............................ H02J 7/00712; H02J 7/0048
See application file for complete search history.

(56) References Cited

U.S. PATENT DOCUMENTS

| 11,735,919 B2* | 8/2023 | Cruickshank, III ... G05B 15/02 700/295 |
| 2011/0231028 A1 | 9/2011 | Ozog |
| 2015/0200723 A1 | 7/2015 | Tochio |
| 2016/0013652 A1 | 1/2016 | Li et al. |
| 2016/0020608 A1 | 1/2016 | Carrasco et al. |

FOREIGN PATENT DOCUMENTS

WO     2012013690 A1    2/2012

* cited by examiner

*Primary Examiner* — Gary Collins
(74) *Attorney, Agent, or Firm* — Invention To Patent Services; Alex Hobson (57) ABSTRACT

Autonomous battery charging and discharging is accomplished using a load shaping signal, e.g., an optimized load shaping (OLS) signal, as specified in American National Standard ANSI/SCTE 267 2021. A battery charge controller connected to the power grid, microgrid, or nano grid autonomously interprets the load shaping signal and takes local action to charge/discharge without requiring two-way communications, signing-up, or opting-in to a network or cloud-provided service. The system makes it possible for the same load shaping signal to be used not only by all types of electric loads but also by all types of batteries.

19 Claims, 7 Drawing Sheets

| Bat OLS, 90% RTE | Discharge Checksum | Charge Checksum | Cumulative in/out Start @ 50% SOC | Cumulative in/out Start @ 5kWh |
|---|---|---|---|---|
| -0.48% | -3.43% | 0.00% | 46.4% | 4.64 |
| -0.50% | -3.55% | 0.00% | 42.6% | 4.26 |
| -0.54% | -3.83% | 0.00% | 38.6% | 3.86 |
| -0.61% | -4.32% | 0.00% | 34.1% | 3.41 |
| -0.64% | -4.53% | 0.00% | 29.4% | 2.94 |
| -0.42% | -2.99% | 0.00% | 26.2% | 2.62 |
| -0.61% | -4.30% | 0.00% | 21.7% | 2.17 |
| -0.98% | -6.95% | 0.00% | 14.6% | 1.46 |
| -0.62% | -4.39% | 0.00% | 10.0% | 1.00 |
| -0.33% | -2.31% | 0.00% | 7.5% | 0.75 |
| 0.24% | 0.00% | 1.73% | 9.0% | 0.90 |
| 0.58% | 0.00% | 4.11% | 12.8% | 1.28 |
| 1.07% | 0.00% | 7.61% | 20.2% | 2.02 |
| 1.20% | 0.00% | 8.50% | 28.4% | 2.84 |
| 1.18% | 0.00% | 8.34% | 36.5% | 3.65 |
| 1.06% | 0.00% | 7.55% | 43.7% | 4.37 |
| 0.76% | 0.00% | 5.36% | 48.8% | 4.88 |
| 0.56% | 0.00% | 3.96% | 52.6% | 5.26 |
| 0.01% | 0.00% | 0.07% | 52.4% | 5.24 |
| 0.47% | 0.00% | 3.31% | 55.5% | 5.55 |
| 0.30% | 0.00% | 2.12% | 57.3% | 5.73 |
| 0.00% | 0.00% | 0.01% | 57.1% | 5.71 |
| -0.46% | -3.29% | 0.00% | 53.7% | 5.37 |
| -0.49% | -3.46% | 0.00% | 50.0% | 5.00 |
| | Sum -47.34% | Sum 52.66% | | |
| | | Round Trip 90% = Efficiency | | |

FIG. 7

AUTONOMOUS BATTERY CHARGING AND DISCHARGING SYSTEM USING A LOAD SHAPING SIGNAL

CROSS REFERENCE TO RELATED APPLICATIONS

This application is a continuation in part of U.S. patent application Ser. No. 17/774,943, filed on May 6, 2022, which is a National Stage application of PCT/US2020/062467, filed on Nov. 26, 2020, and this application is a continuation in part of U.S. patent application Ser. No. 17/329,210, filed on May 25, 2021, which is a continuation in part of PCT/US2020/062467, filed on Nov. 26, 2020, and which claims the benefit of U.S. provisional patent application No. 62/940,920, filed on Nov. 27, 2019 and U.S. provisional patent application No. 62/940,922 filed on Nov. 27, 2019, and this application claims the benefit of U.S. provisional application No. 63/297,697, filed on Jan. 7, 2022; all of which are incorporated by reference in their entirety herein.

BACKGROUND OF THE INVENTION

Field of the Invention

The invention relates to an autonomous battery charging and discharging system. The system may be, for example, an electric vehicle or a battery charger.

Background

The American National Standards Institute/Society of Cable Telecommunications Engineers (ANSI/SCTE 267 2021) optimum load shape (OLS) standard simplifies electricity demand-side management, by requiring only one-way communication to enable devices to receive load shaping signals and then voluntarily participate in continuously shaping, (time-shifting and modulating) their demand for electricity, also known as load, to reduce their electric bills. Here-to-fore, there was no method specified for battery charging to be managed autonomously using a load shaping signal.

Presently, closed proprietary systems are employed to control remote power storage sources, such as the Powerwall system manufactured by Tesla Inc, San Carlos, CA. Such systems are closed and proprietary in the sense that the mechanism is not open to the public and the end-user has no control over how much and when their local battery system charges and discharges. Further, two-way communication, including user registration and authentication is required for use of systems such as the Powerwall system.

In other words, the current solutions are not autonomous, in that they require two-way communications, control, and management by the upstream host network.

SUMMARY OF THE INVENTION

The invention is directed to an autonomous battery charging and discharging system that expands the universe of devices that can participate in shaping load by adding batteries to the mix that autonomously and voluntarily use the same OLS signals.
Definition of Load Shaping Signal A forecast load shape signal may be used to manage the demand for electricity by flexible loads such as for charging electric vehicles (EVs) and facility batteries. A forecast may be a day ahead forecast, for example, which may be based on historical usage date. The ANSI/SCTE 267 2021 OLS standard provides for end-to-end, generation to load control of the electric power grid towards the goals of reducing energy costs, maximizing the use of renewable energy, and accelerating the adoption, monetization, resiliency, and societal benefits of microgrids, EVs, and batteries.

A number of topics are addressed in the ANSI/SCTE 267 2021 OLS standard:
1. A generation-to-load OLS architecture is specified.
2. Based on inputs of forecast load and forecast generation from renewables, a method for producing an OLS is specified.
3. A method for managing the charging of electric vehicles is specified as an example of how any smart load can autonomously interpret and take local actions based on an OLS.

In addition to electric vehicles which have mobile batteries, smart loads may include fixed batteries and other devices such as Internet-connected thermostats that control space and water heating/cooling. The OLS standard was needed because existing siloed standards did not provide for the end-to-end, generation to load control of the electric power grid.

An autonomous battery control system is configured to control when a battery is charged and discharged, based on a load shape of a power source, such as from a power grid. An optimized load shape is the average energy available on a power source throughout a period of time, such as for a given day. The available energy may be highest during the late night hours until people wake up and start to require electric energy at which point the average available energy of the power source drops. A maximum use of energy may be when people come home from work or the evening hours from about 5 pm until about 10 pm. An exemplary autonomous battery control system comprises an interface for receiving said optimum load shape from a power source system. The interface may receive an OLS through a wired or wireless connection. An autonomous battery control system may have an interface that includes a wireless receiver to receive the OLS data. The OLS may be delivered daily and/or may be updated periodically based on changes in power demand on the power source. A processor of the autonomous battery control system is configured to determine a centerline of the load shape or OLS. The process may then control when the battery receives power from the power source to charge the battery or battery and when the battery discharges to provide power to a load. The autonomous battery control system may create an optimized charge/discharge shape (OCDS) that the processor utilizes to cause the battery to charge and discharge. The OCDS may be proportional to the load shape or optimum load shape provided from the power source system.

The autonomous battery control system may determine a center line of the OLS, a line that splits the average energy from the power source such that the amount of energy above and below the center line are equal. An autonomous battery control system may cause a batter to be charged when the average energy available from the power source is above the center line and may cause the battery to discharge when the average energy available from the power source is below the center line. In this way, the battery is charged when there is the most available energy from the power source and discharge when there is the greatest demand for power from the power source. This may reduce the cost for power as power or electrical energy may be less when there is the most available energy from the power source.

The autonomous battery control system may adjust the center line by an offset to enable roundtrip efficiency, wherein the battery is fully charged prior to the beginning of the discharging cycle. The offset of the centerline and therefore the offset in when the battery is charged and discharged may be determined to enable 100% roundtrip efficiency or less than 100% roundtrip efficiency. Substantially 100% roundtrip efficiency, as used herein means that the battery is within 20% and preferably within 10% of a full state of charge after a discharge and charge cycle determined by the OCDS and by the time and rate of charge and time and rate of discharge. The processor may initiate a charge cycle and/or discharge cycle at a time shift from a centerline determined time. This initiation or switching time event, switching from charging to discharge or vice versa, may be determined by the centerline offset. In addition, the processor may receive an OLS and then determine an adjusted OCDS based on the battery input to a load and therefore time shift charge and discharge cycles factoring in the power being supplied by the battery. This updated of modified OCDS may be transmitted back to the power source system.

A battery, as used herein, is a source of electrical power, an electrical power storage device, having one or more electrochemical cells with external connections for powering electrical devices. A battery as described herein is a rechargeable battery that is configured to be recharged and discharged. A battery may be a lithium battery, an alkaline battery, a carbon zinc battery, silver oxide battery and the like. A battery may include one or more individual batteries that may be connected in series or parallel.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
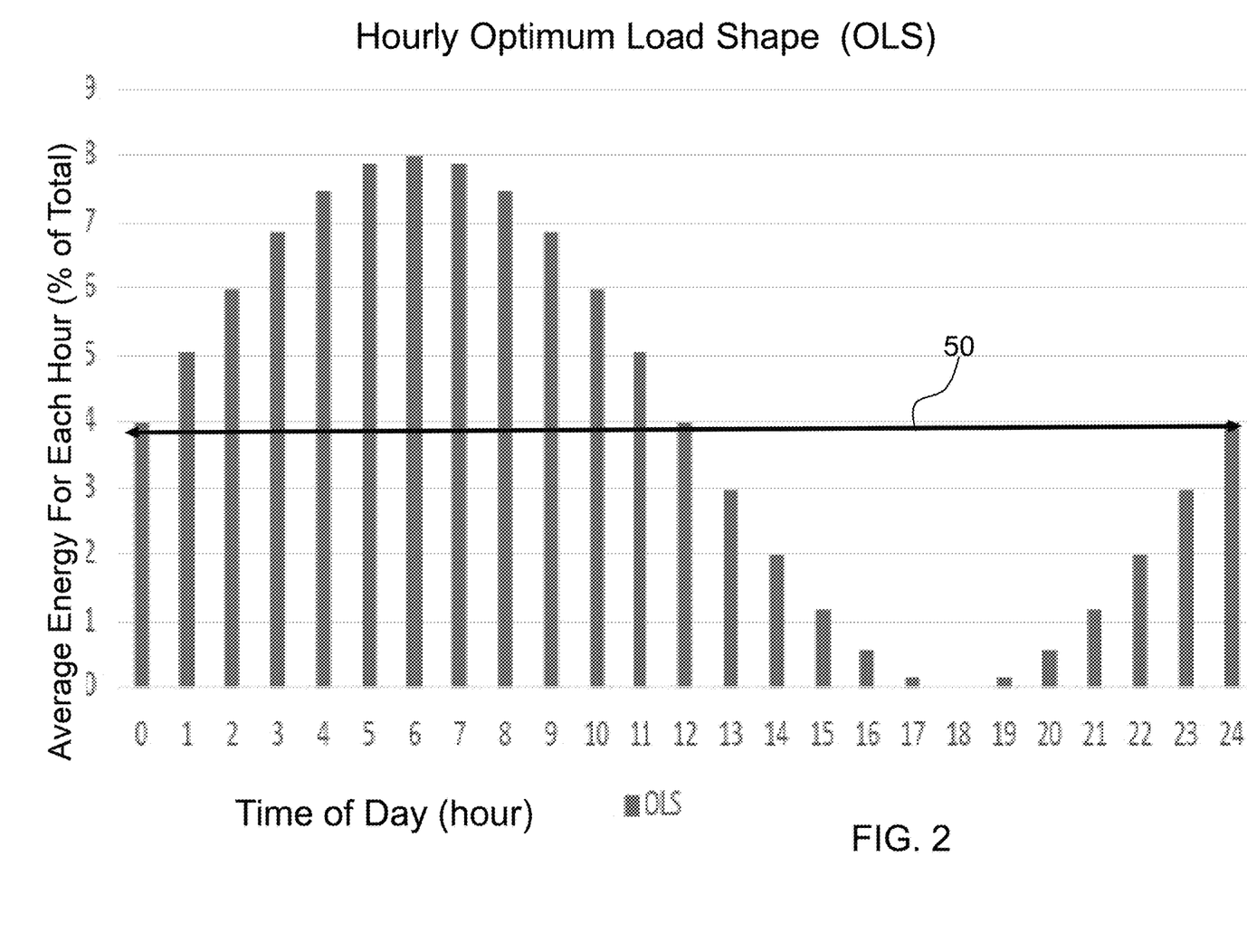
FIG. 2 shows a graph of available energy by hour from a power source which may be an optimum load shape for a battery charger that acquires the same hourly load shaping signal as other appliances at a given location.
Figure 3:
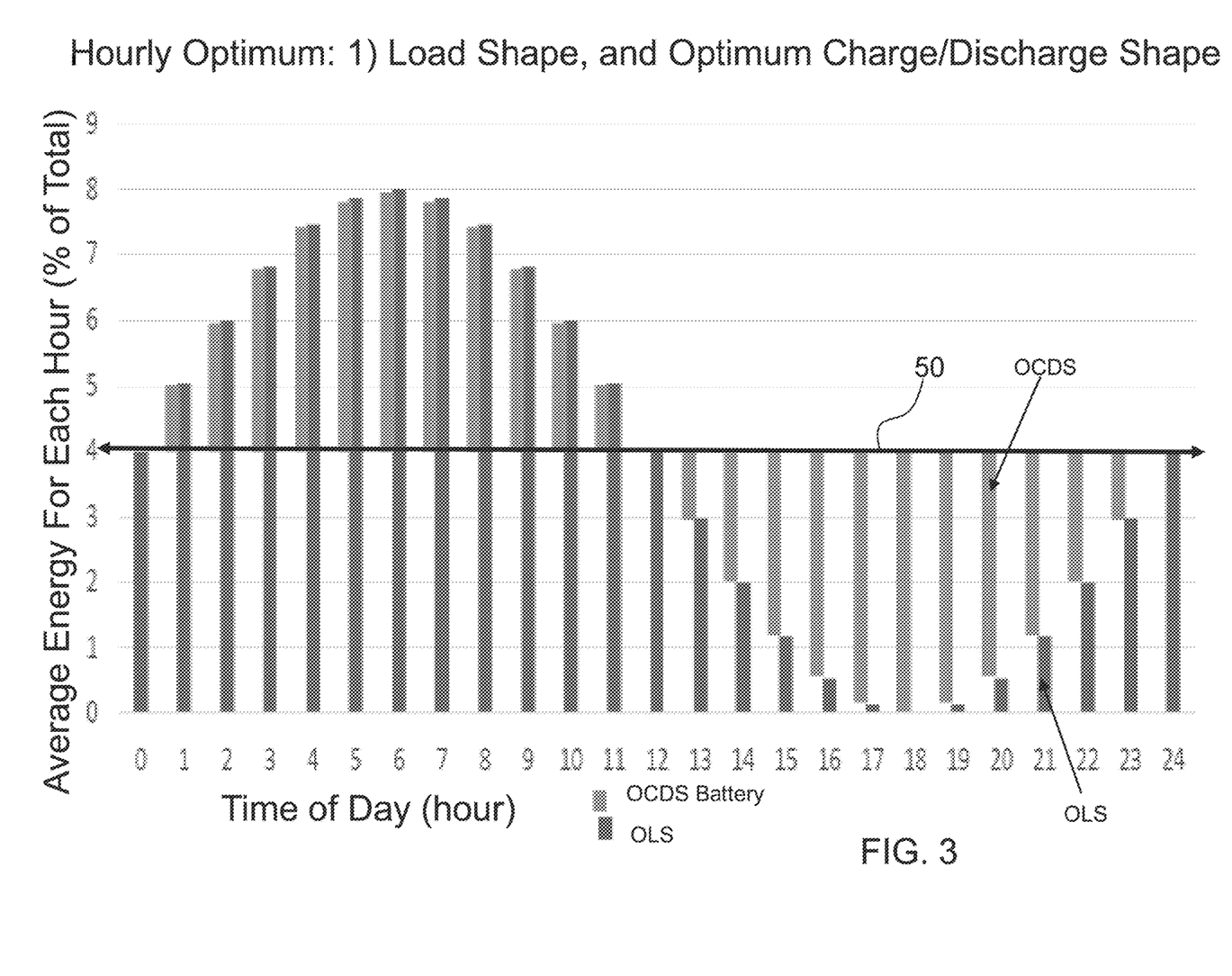
FIG. 3 shows a graph of available energy by hour and an optimum battery load shape and how a battery charger autonomously divides the load shaping signal into one or more charge and discharge intervals.

This invention enables one or more battery control systems to voluntarily and automatically reduce electricity bills by modulating (increasing or decreasing) and time-shifting the rate of charge and discharge thereby creating virtual power plants that:

1. Acquire a load shaping signal via one or more broadcast or 2-way networks (1-way communication required, 2-way communication optional);
2. Autonomously and locally derive, at the battery location, an OCDS shape as shown in FIGS. 2 and 3;
3. Calculate or recalculate (lower) the centerline of the OCDS in FIG. 3 by the offset needed to properly account for <100% roundtrip efficiency, e.g., for a 90% efficient 10 kWh battery, 10 kWh units of charge produces only 9 kWh of discharge;
4. Further, adjust the offset of the OCDS centerline to accommodate any differences desired between the beginning of the period and the end of the period state of charge (SOC); and
5. Time-shift the operation of battery charging to follow the OCDS without requiring any communication with any entities while still allowing for voluntary charger participation and customer override.

Figure 1:
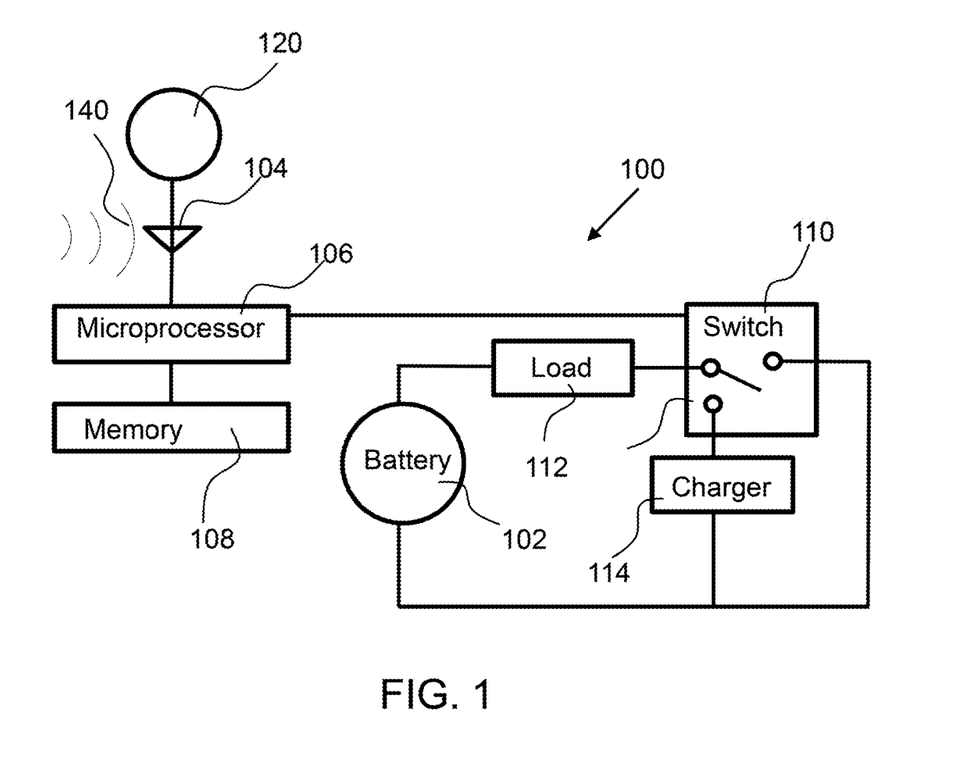
FIG. 1 shows a system diagram of an enabled battery charger.

As shown in FIG. 1, an exemplary battery control system 100 includes components used to control when a battery 102 is charged from a power source 120 and discharged to a load 112. A load signal 140, such as an Optimum Load Signal (OLS) may be obtained by an interface 104, such as a terminal or antenna or other interface for receiving signals. A microprocessor 106 that executes instructions stored in a memory 108, for example, controls a switch 110 to control when the battery 102 is charged and/or discharged. A load 112 may represent an appliance configured to draw electrical power from the battery 102. The charger 114 may include the switch 110 to charge the battery 102 from the power source 120.

As shown in FIG. 2, a load shape or optimum load shape indicates available energy from power source over a period of time, such as hours of the day, as shown. The load shape may be an optimized load shape for charging a battery, wherein the optimum time to charge the battery is when there is the most available energy from the power source and wherein the optimum time to discharge the battery to a load is when there is the least available energy from the power source. The load shape may be from a power source system such as a power grid. As can be seen, the OLS commands the end-user appliance or domain to demand, i.e., consume, power (Y-axis) at a maximum at 6 am (X-axis) which gradually decreases to zero at 6 pm at night and then begins again to demand power.

The autonomous battery control system may calculate a center line 50, wherein the amount of available energy from the power source is divided above and below the centerline. The amount of energy greater than the center line is the same as the amount of energy that is less than the center line. The center line available energy may be the point where a battery is switch from charging from the power source to discharging to a power source or to a load that the power source provides power to, thereby decreasing the demand from the power source.

The battery is in one sense like an appliance that absorbs energy, that is it creates load, and in that sense, the battery in one embodiment follows the same OLS. In other embodiments described below, the battery may additionally operate to deviate from the OLS according to, for example, battery characteristics and different starting and ending states of charge.

Figure 4:
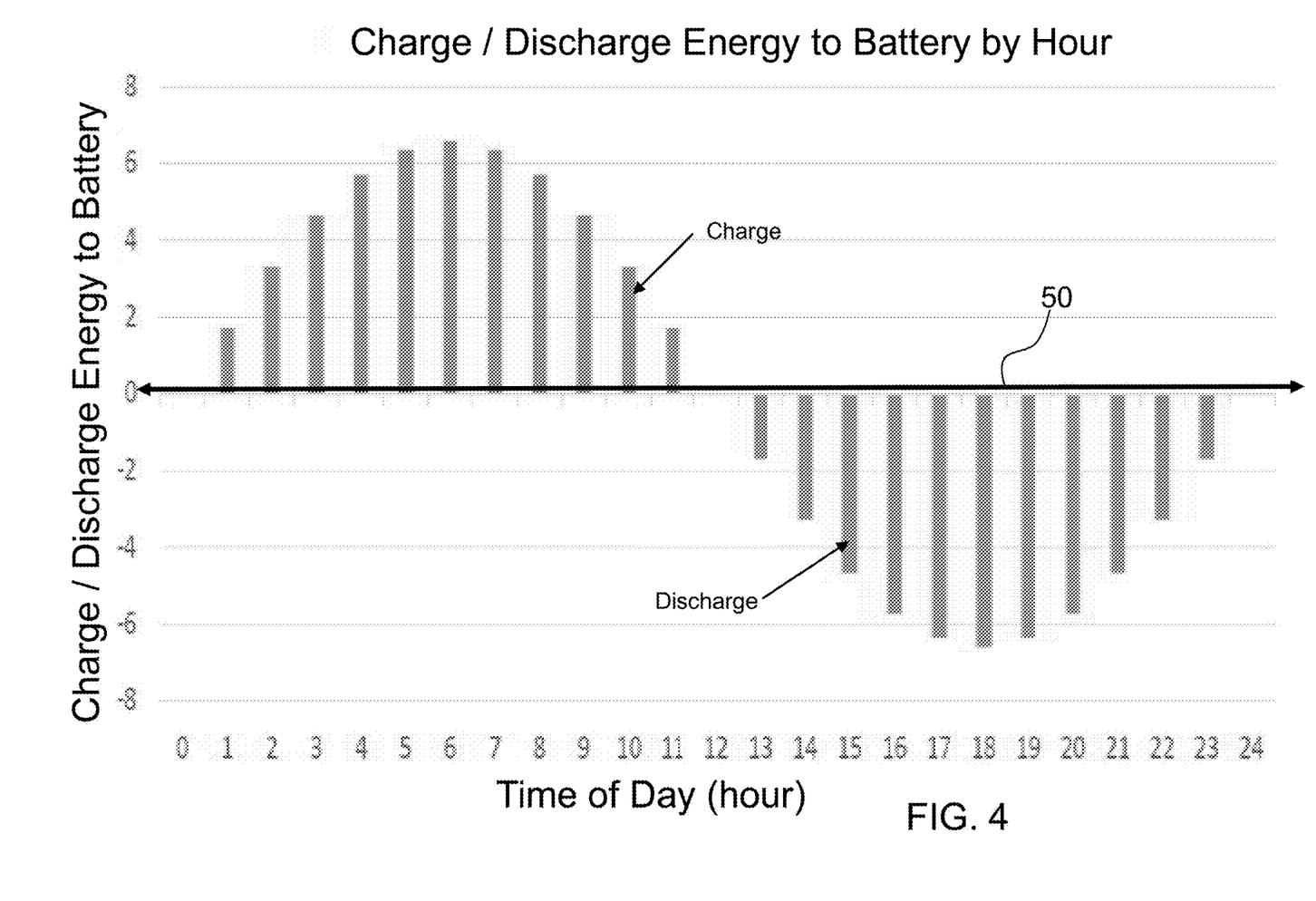
FIG. 4 shows a graph of available energy by hour and an optimum battery load shape shown in FIG. 3 and how a battery charger autonomously scales optimized charge discharge shape (OCDS) while accounting for roundtrip losses and the desired end state of charge

Referring now to FIGS. 3 and 4, an optimum battery load shape for charging and discharging in inverse to the optimum load shape of available energy. As shown in this example, the battery charges over the initial period, or from midnight to a maximum charge amount at 6 am and then declines in charging rate until noon. The battery then begins discharging at an increasing rate until about 6 pm, when a maximum energy requirement is reached. The battery then reduces discharge until about midnight. The optimum battery load shape includes charging as best seen in FIG. 4 with a positive energy draw from the power source and discharging or providing power to a load with a negative energy requirement from the power source. At that point, the battery autonomously goes into discharge mode, as controlled by the microprocessor, that is powering other devices in the network, from noon until 6 pm at night, at which point the battery continues to discharge, i.e., provides power, but at a decreasing rate until 12 midnight. In other words, the battery is charging while power is plentiful, in the early part of the day, e.g., when demand is lower, and then provides power to other devices, e.g., when demand for power is higher, in the latter part of the day. In this manner, the battery supports the network, by charging when the power network has available capacity, yet alleviates power shortages by assisting the network with reduced power consumption when power is in higher demand.

In one embodiment, the invention in step 2 can determine how the battery autonomously operates itself by determining an OCDS that specifies how much and when the battery or storage device charges and discharges. To that end, a cross-section point or centerline of the load shape or OLS is determined. Then the invention controls the charging at a rate or value proportional to the OLS when the OLS is above the cross-section point and discharging when the OLS falls below the cross-section point. In this sense, the battery is operated according to the invention differently than an appliance. The battery in the second part of the OLS is alleviating power demand by adding power back into the network.

FIG. 4 shows a simplified OCDS of the battery that follows the outline of the OLS. It shall be appreciated that the OCDS in step 2 is shown to follow the outline of the OLS, but that a different OCDS may be selected, based on, for example, local needs, battery characteristics, or start or end times of charging as will be detailed below. However, the OCDS, which determines the rate of charge and discharge can be based on other factors such as user manual override selection, for example, if the user has special needs for a certain time period. Another example is based on predicted weather disruptions, where the user may want the battery to be fully charged in advance of predicted outages. Therefore, the OCDS may not always follow the shape of the OLS and might be adjusted by this invention.

Regarding the steps outlined above, it shall be appreciated that the steps thereof may be in a different order or permutation than summarized here. In the first step, the OLS signal is acquired. As already mentioned, the OLS may be acquired from a one-way communication from the network or power grid side to the end-user. This may be, for example, a broadcast signal, including any of the known communications technologies, including a satellite or passive communication system. It shall be appreciated therefore that the instant invention is more secure in that two-way traffic that can be hacked is avoided, but also that the instant invention is more robust in that the OLS signal can be obtained from any type of communication broadcast or multiple broadcasts such as to remote areas that can only receive one-way satellite signals. Nonetheless, it shall be appreciated that the invention also works with a two-way communication system.

Figure 5:
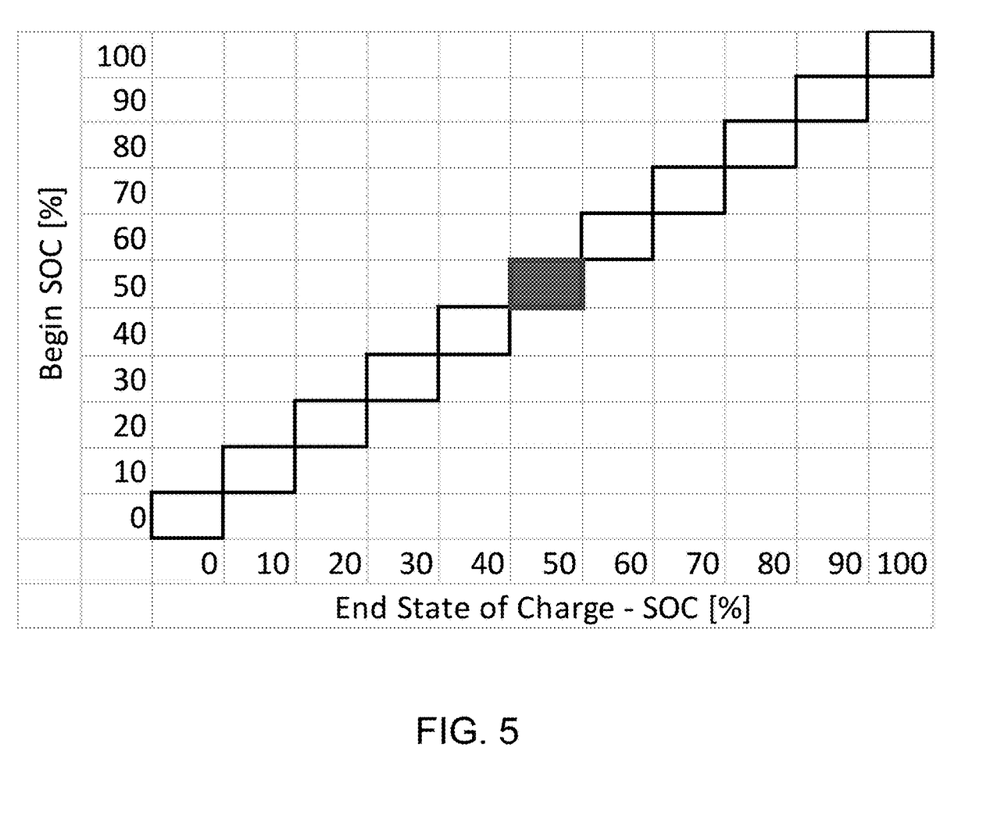
FIG. 5 shows a chart of a beginning state of charge versus and ending state of charge for a device being charged via a battery charger.

To continue in Step 3, an additional modification of the OCDS based on characteristics of the battery such as the round-trip charging efficiency can be achieved according to an embodiment of the invention. The above examples with respect to FIGS. 2-3 represent somewhat of a simplified situation where the charging and discharging are perfectly lossless, also known as ideal. Referring now to FIG. 5, there is shown in column B an illustrative real scenario where charging and discharging is not perfect. This may be due to, for example, battery capacity reduction due to aging, loss of charging due to thermal dissipation, and the like. As will be seen from the figure, the battery is only capable of charge and discharging with a 90% efficiency, meaning that it appears from the user end that the battery is being charged to 100% capacity, but when discharged only provides 90% of the energy used to charge the battery. The invention shifts the center line downward until charging is increased and decreasing discharging until the 90% efficiency is reached. In other words, the invention will accommodate charging inefficiencies and maximize the actual capacity of a battery.

At this point, the charging and or discharging is matched to the capabilities of the particular battery and system it is attached to. In effect, this manages the energy usage of the battery and ensures that a user can reliably draw all the power out of the battery that is possible. Otherwise, without this management capability, a user may expect more capacity out of a battery, which could lead to faulty energy planning and a power outage at the user end.

It shall be appreciated that the invention in this embodiment can also shift the line upwards to adjust for a larger capacity than expected. This can happen when there is a higher demand currently by the user than for a future expected usage or supply of charging power.

In another aspect of the invention, the beginning and or end time of charging and discharging may be flexibly set in Step 4 based on either user preferences or the characteristics of the local environment. For example, the user or controller may wish to optimize for more than a set cycle such as a 24-hour day. In another example, the user plans on an event requiring higher local energy needs, such as throwing a party or heating the pool. In this sense, the system provides an override to allow the user to set or pre-empt a time when the battery is charged or discharged.

For example, in case there is an expected power outage due to, for example, a predicted weather storm, the user or battery controller may decide to override the charging/discharging shape currently determined for the battery and choose to continue charging or forestall discharging in order to provide sufficient power the usual operating preset, the invention then recalculates the charging/discharging shape from that point where the battery is charged at a certain level. When the invention has performed the preceding steps 1-3 and optionally step 4, the effect of which will shift the charging/discharging shape according to the desired shape.

The invention also envisions including a multi-system authentication system, in which more than one broadcast network 'or more than one type of broadcast is used to authenticate the OLS. In this way, it is considered that the invention here can be made even more secure.

It shall be appreciated that, in the present invention, only a one-way communication is needed to operate the remote battery charging and/or discharging. The one-way communication is from the power grid side to the end-user side.

It shall further be appreciated that personal information or personally identifiable information is not required in the present invention. No registration is needed. That is, less information and access points are available to hackers to either misuse the information or hack into the user's system(s). Therefore, the present invention is less hackable.

Figure 6:
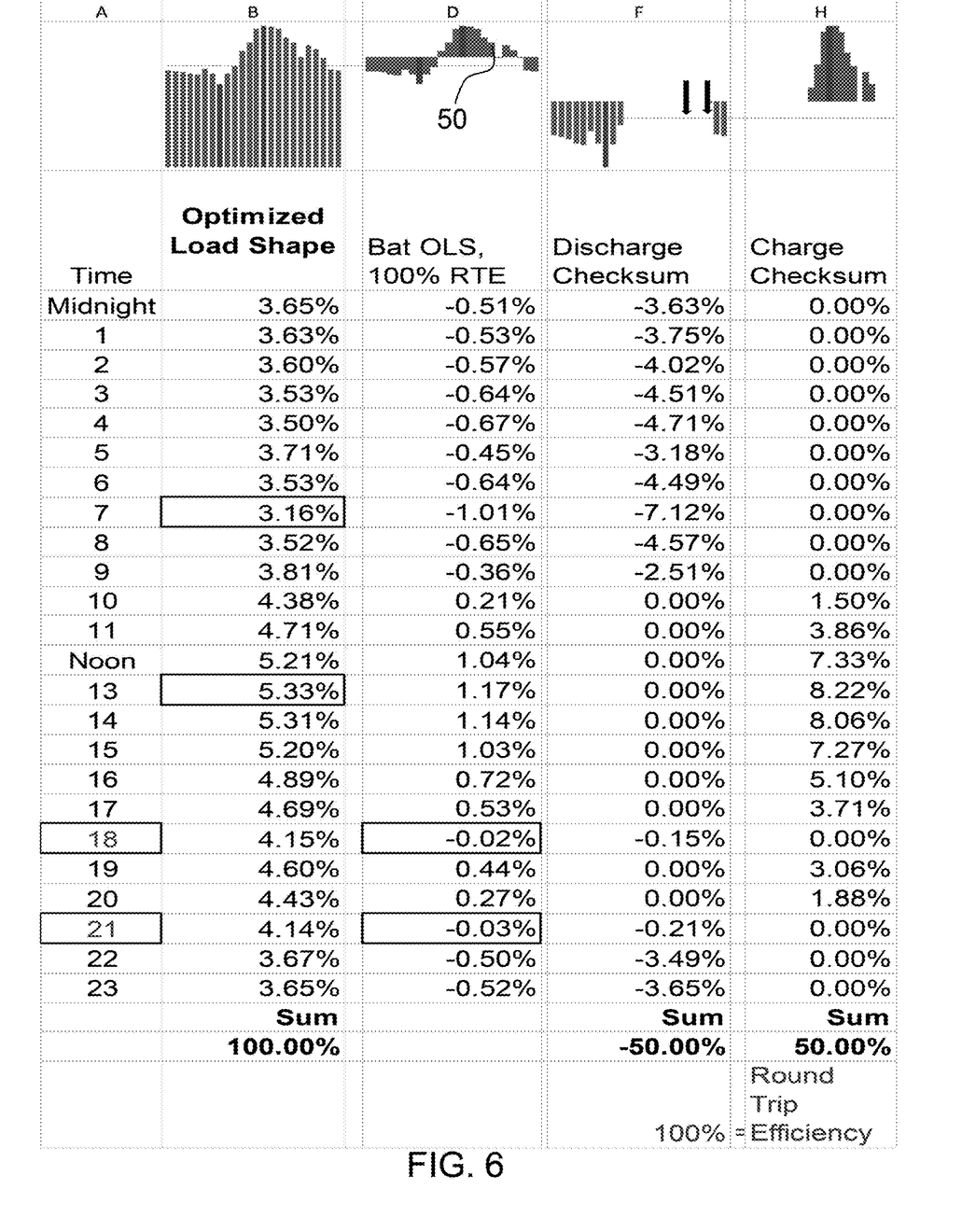
FIG. 6 shows a chart of a detailed charge/discharge example.
Figure 7:
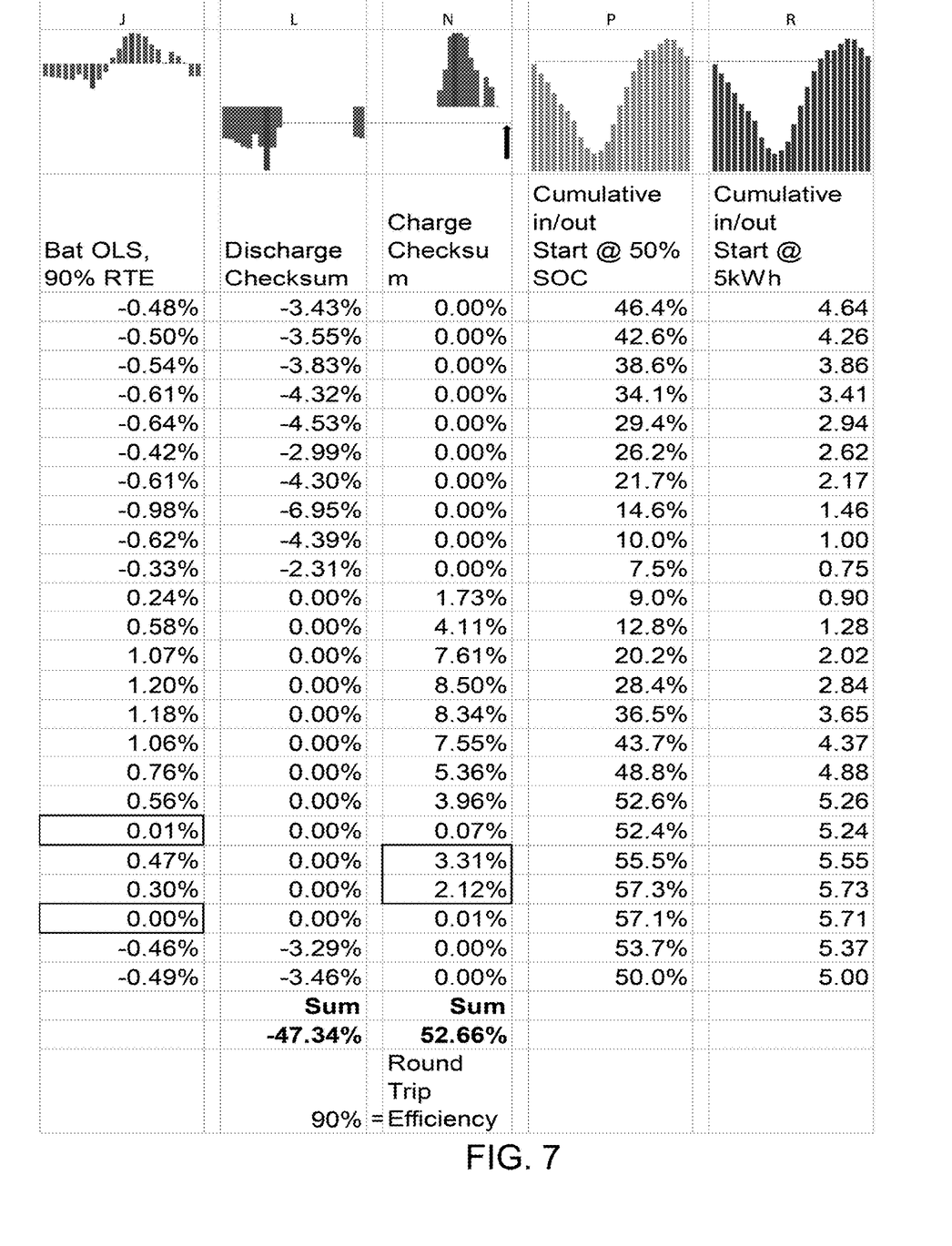
FIG. 7 shows a chart of a detailed charge/discharge example.

Turning now to FIGS. 6 and 7 column A shows time and column B shows an actual example of the OLS, where the bars indicate time-varying load with a minimum and maximum of the load (Y-axis) over a period of 24 hours (x-axis), which comports to Step 1. The rows show the values in percentage of the OLS, which add up to 100 percent. Column B, thus, represents the optimized load shape that the network wants the end-user devices in the aggregate at a particular location or region to achieve.

Column D is the result of determining a center line of the OLS in column A as heretofore described with respect to Step 2. It shall be seen that the bars below the center line are discharging and the bars above the center line 50 are charging.

Rows in column D represent the percentage charge or discharge reserved for each interval.

It shall be noticed that the curve in Column D in this actual case has a discharge period first, in contradistinction to the example in FIG. 1, followed by a charging period, bars above the center line, with a small discharge period of two bars after the charging period.

Column F shows the discharging separated out and the rows indicate the percentage of discharge. Column H shows the charging separated out and the rows indicate the percentage of charge. When adding each of the percentages in the F and H columns, it is verified that the calculations of the invention ideally indicate that the amount of charge is substantially equal to the amount of discharge. That is, it is verified that the amount of energy put into an ideal battery is also recovered.

However, in the real world batteries are not ideal and follow an imperfect charging and discharging model. As shown in Column J, there is the actual case where more energy is required to charge the battery than can be released through discharge. In this case, the invention shifts the center line downward to define a new horizontal charge-discharge axis. The downward offset is equal to the amount needed to continue charging the battery to its maximum potential. It can be seen in the expanded view of column J that this results in this case in a slight additional charge during all times, but particularly can be seen at hours 18 and 19 as highlighted in column N.

Columns L and N are the corresponding discharge and charge percentages respectively for the new charge/discharging shape in column J. Here it shall be seen that the efficiency is calculated to be 90% which matches the actual round-trip efficiency of the battery and connected system. This results in a net increase in charging as shown by the increase in charging energy as shown in row 29, column N.

Column P is a cumulative bar graph of the charging and discharging of the battery. This illustrates how far the battery will be depleted and then charged, ie, how much energy is in the battery for a given starting battery SOC. In this case, the SOC at the start was 50%. In one embodiment, the target of a battery at any time is less than 100% and may be, for example, 50%, which gives the battery deficit.

Further, it shall be seen in the cumulative view how much energy can be drawn out of the battery, or how much we plan to take out. It must be remembered, that the graphs in this figure are a prediction of how the battery will perform and should be operated. In other words, the maximum that the battery can be discharged given the adjusted optimized OCDS shape in column J, is shown as the minimum of the bar graph in column P.

Column R is column P scaled for a 10 kWh battery. Column R shows the values of the kWh remaining in the battery at each time slot. As can be seen, the 10 kWh battery starts at 5 kWh or 50% SOC and is discharged to 0.75 kWh at hour 9. At this time, the battery starts to be charged back up until it reaches its starting value of approximately 5 kWh at hour 16 and continues to charge through hour 20. At this point, the battery starts to discharge again.

In one embodiment, the battery does not have to follow the adjusted optimum load shape shown in column J. As indicated, the battery can charge and discharge based on planned events or expected power grid outages. In this sense, the battery of the user is at times an assistant to the power grid, that is when it follows the optimized load shape, and at other times assist the user, that is when it follows a plan determined for the user's personal needs. In any event, it shall be appreciated that the charging and discharging of the battery is being managed by the present invention.

In the previous examples, P and R, it is assumed that the battery charge is scheduled to start and end with the same SOC, for example, 50%. This is but one scenario of many scenarios of different beginning and ending SOCs. FIG. 5 illustrates the case graphically where it may be that the invention deviates from that planned schedule. In the case where the objective of the user is to deplete the battery by the end of the day, for example, the center line in FIGS. 6 and 7 would be shifted up to a point where the battery reaches 0% SOC by midnight. It shall be appreciated that the term center line is employed in the instant specification for convenience and that any delineation line divining the OLS is within the scope of the invention. The divining line could thus be thought of as a charge axis.

Alternate Features

In addition to the concepts presented thus far, the instant invention has or enables several alternate features. In one example, pre-set shapes can be used to allow for different local environment behaviors to be stored in the memory coupled to the controller, such as a pre-set shape for normal usual energy usage patterns; those that optimally benefit the power grid. In addition, different pre-set shapes could account for expected but not routine larger energy usage, predicted outages or catastrophes, etc.

In a different aspect, the instant invention can accommodate an OLS and recursive feature, wherein participation of loads and batteries have a beneficial effect resulting from the aggregate behavior of many devices. In this case, so much load responds favorably that the OLS signal may be recursively recalculated or otherwise updated to reflect future amounts of participating devices that serve to lighten the load.

In yet another aspect, the OLS producer, i.e., the OLS server in a client-server model, can use machine learning to be able to predict the amount of responsive load in different environmental conditions, including routine and severe weather. The machine learning algorithms would be used to answer the question: "What kinds of demand flexibility can be reliably factored into daily resource schedules and mix of the unit commitments of power generating facilities." There will be a role for machine learning to take into account the amount of load shaped under various weather and myriad other conditions. As more devices participate, machine learning can help keep track of "On Tuesday during a heatwave at time t, in the presence of XX environmental conditions, OLS asked for YY load add/shed and got ZZ add/shed".

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An autonomous battery control system configured to control when a battery is charged and discharged based on a load shape of a power source, said battery control system comprising:
an interface for receiving said load shape from a power source;
a processor configured to determine a center line of said load shape and cause charging said battery from the power source when the load shape is above said center line, and discharging said battery to a load when the load shape is below said center line.

2. The autonomous battery control system of claim 1, wherein the load shape is an optimized load shape of a power demand on the power source.

3. The autonomous battery control system of claim 2, wherein an optimized charge discharge shape (OCDS) that the processor follows in charging the battery is determined from the optimized load shape.

4. The autonomous battery control system of claim 1, wherein an optimized charge/discharge shape (OCDS) that the processor follows in charging the battery is determined from the load shape.

5. The autonomous battery control system of claim 1, wherein the optimized charge discharge shape that the processor follows in charging the battery is proportional to the load shape.

6. The autonomous battery control system of claim 1, wherein the processor adjusts the center line by an offset according to the battery roundtrip efficiency.

7. The autonomous battery control system of claim 6, wherein the offset is calculated by the processor for <100% roundtrip efficiency.

8. The autonomous battery control system of claim 1, wherein the processor adjusts the center line by an offset according to a battery efficiency.

9. The autonomous battery control system of claim 1, wherein the center line is adjusted to accommodate a difference between a beginning of period and an end of period state of charge.

10. The autonomous battery control system of claim 1, wherein the processor causes a time-shift of charging to follow an optimized charge/discharge shape without requiring any communication with any entities.

11. The autonomous battery control system of claim 1, wherein the processor calculates the optimized charge/discharge shape utilizing an amount of charge drawn by the battery from the power sourced and an amount of discharge provided by the battery to the load.

12. The autonomous battery control system of claim 11, wherein the processor modifies the optimized charge/discharge shape by a time shift.

13. The autonomous battery control system of claim 11, wherein the processor modifies the optimized charge/discharge shape by center line offset.

14. A method to control charging a battery from a power source and discharging said battery to a load comprising:
providing an autonomous battery control system configured to control when a battery is charged and discharged based on a load shape of a power source, said battery control system comprising:
an interface for receiving said load shape from a power source;
a processor configured to determine a center line of said load shape and cause charging said battery from the power source when the load shape is above said center line, and discharging said battery to a load when the load shape is below said center line;
the interface receiving a load shape;
the processor determining said center line of the load shape; and
the processor causing charging of the battery when an average energy of the load shape is more positive than an average energy of the center line, and discharging the battery when the average energy of the load shape is less than the average energy of the center line.

15. The method of claim 14, wherein the load shape is an optimized load shape.

16. The method of claim 14, wherein the processor creates an optimized charge/discharge shape that the processor follows in charging the battery.

17. The method of claim 16, wherein the optimized charge/discharge shape that the processor follows in charging the battery is proportional to the load shape.

18. The method of claim 14, wherein the processor adjusts the center line by an offset according to a roundtrip efficiency.

19. The method of claim 14, wherein the processor adjusts the center line by an offset according to a battery efficiency.

* * * * *